(12) United States Patent
Pratt et al.

(10) Patent No.: US 9,912,358 B2
(45) Date of Patent: Mar. 6, 2018

(54) METHOD OF AND APPARATUS FOR TRANSMIT NOISE REDUCTION AT A RECEIVER

(71) Applicant: ANALOG DEVICES GLOBAL, Hamilton (BM)

(72) Inventors: Patrick Joseph Pratt, Cork (IE); Peadar Antony Forbes, Cork (IE)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 14/874,883

(22) Filed: Oct. 5, 2015

(65) Prior Publication Data

US 2016/0277046 A1    Sep. 22, 2016

Related U.S. Application Data

(60) Provisional application No. 62/136,301, filed on Mar. 20, 2015.

(51) Int. Cl.
*H04B 1/04* (2006.01)
*H04B 1/10* (2006.01)
*H04B 1/525* (2015.01)

(52) U.S. Cl.
CPC ......... *H04B 1/0475* (2013.01); *H04B 1/1018* (2013.01); *H04B 1/525* (2013.01)

(58) Field of Classification Search
CPC . H04L 5/14; H04L 12/26; H04L 25/08; H04L 25/49; H04B 15/00; H04B 1/62; H04B 1/10; H04B 3/23; H04B 1/04; H04B 1/44; H04B 7/216; H04B 1/713; H04B 1/38; H04B 3/20; H04F 3/217; G08C 19/12; G01S 7/03

USPC ........................................................ 455/126
See application file for complete search history.

(56) References Cited

U.S. PATENT DOCUMENTS

| | | |
|---|---|---|
| 5,590,156 A | 12/1996 | Carney |
| 5,848,097 A | 12/1998 | Carney et al. |
| 6,317,583 B1 | 11/2001 | Wolcott |
| 6,745,018 B1 | 6/2004 | Zehavi et al. |
| 6,760,342 B1 | 7/2004 | Skones |

(Continued)

FOREIGN PATENT DOCUMENTS

| | | |
|---|---|---|
| CN | 1914812 | 2/2007 |
| CN | 101060349 | 10/2007 |

(Continued)

OTHER PUBLICATIONS

Amin et al., "Transmit and Receive Crosstalk Cancellation", 2010 6th International Conferences on Emerging Technologies, pp. 210-215.

(Continued)

*Primary Examiner* — Edward Urban
*Assistant Examiner* — Ralph H Justus
(74) *Attorney, Agent, or Firm* — Knobbe, Martens, Olson & Bear, LLP

(57) ABSTRACT

A method of reducing the noise from a transmitter at an associated receiver is disclosed. Noise contributions in active channels are identified and used to update a shared noise cancellation filter. Excluding signals from inactive channels speeds up the filter convergence to a near optimal solution. Sharing a filter across multiple channels reduces component count and power consumption.

20 Claims, 16 Drawing Sheets

(56) References Cited

U.S. PATENT DOCUMENTS

| | | | |
|---|---|---|---|
| 6,898,235 | B1 | 5/2005 | Carlin |
| 6,965,657 | B1* | 11/2005 | Rezvani .................. H04B 3/32 |
| | | | 375/346 |
| 7,006,474 | B2 | 2/2006 | Oates |
| 7,155,179 | B1 | 12/2006 | Rothenberg |
| 7,327,777 | B2 | 2/2008 | Bergstrom |
| 7,869,527 | B2 | 1/2011 | Vetter et al. |
| 8,103,235 | B2 | 1/2012 | Shiotsu et al. |
| 8,170,487 | B2 | 5/2012 | Sahota et al. |
| 8,290,100 | B2 | 10/2012 | Komninakis et al. |
| 8,320,866 | B2 | 11/2012 | Pratt et al. |
| 8,798,559 | B2* | 8/2014 | Kilambi .............. H04B 1/0475 |
| | | | 330/136 |
| 9,083,582 | B2 | 7/2015 | Lukashevich et al. |
| 2002/0085647 | A1* | 7/2002 | Oishi ................... H03F 1/3247 |
| | | | 375/297 |
| 2002/0142725 | A1 | 10/2002 | Clelland et al. |
| 2003/0076899 | A1 | 4/2003 | Kumar |
| 2003/0236067 | A1 | 12/2003 | Hasarchi |
| 2004/0142700 | A1 | 7/2004 | Marinier |
| 2004/0203458 | A1 | 10/2004 | Nigra |
| 2005/0069046 | A1* | 3/2005 | Tsui .................... H04L 27/2647 |
| | | | 375/260 |
| 2005/0094714 | A1 | 5/2005 | Robinson |
| 2007/0183547 | A1 | 8/2007 | Fifield et al. |
| 2007/0184782 | A1 | 8/2007 | Sahota et al. |
| 2009/0086863 | A1 | 4/2009 | Komninakis et al. |
| 2009/0197558 | A1 | 8/2009 | Shiotsu et al. |
| 2009/0213770 | A1 | 8/2009 | Mu |
| 2009/0275304 | A1 | 11/2009 | Thomas |
| 2010/0040189 | A1 | 2/2010 | Sutton |
| 2010/0124257 | A1 | 5/2010 | Yahya |
| 2010/0159837 | A1 | 6/2010 | Dent et al. |
| 2010/0165895 | A1 | 7/2010 | Elahi et al. |
| 2010/0167655 | A1 | 7/2010 | Muhammad |
| 2011/0110409 | A1 | 5/2011 | Sands |
| 2011/0149714 | A1 | 6/2011 | Rimini et al. |
| 2011/0158346 | A1 | 6/2011 | Ballantyne |
| 2011/0300914 | A1* | 12/2011 | Gudem ................ H04B 1/1027 |
| | | | 455/574 |
| 2012/0140685 | A1* | 6/2012 | Lederer ............. H04L 27/3854 |
| | | | 370/286 |
| 2012/0295558 | A1 | 11/2012 | Wang et al. |
| 2012/0322395 | A1 | 12/2012 | McCullagh |
| 2013/0016798 | A1 | 1/2013 | Velazquez et al. |
| 2013/0044791 | A1 | 2/2013 | Rimini |
| 2014/0079167 | A1 | 3/2014 | Adam |
| 2014/0185715 | A1 | 7/2014 | Wollesen |
| 2014/0194071 | A1 | 7/2014 | Wyville |
| 2014/0226587 | A1* | 8/2014 | Tang .................. H04L 25/0206 |
| | | | 370/329 |
| 2014/0269852 | A1 | 9/2014 | Pratt et al. |
| 2015/0043685 | A1 | 2/2015 | Choi |
| 2015/0078226 | A1* | 3/2015 | Charlon ............... H04B 1/525 |
| | | | 370/290 |
| 2015/0188646 | A1 | 7/2015 | Bharadia |

FOREIGN PATENT DOCUMENTS

| | | |
|---|---|---|
| CN | 101379718 | 3/2009 |
| CN | 101453228 | 6/2009 |
| CN | 101529729 | 9/2009 |
| CN | 101895501 | 11/2010 |
| CN | 101946416 | 1/2011 |
| CN | 102611651 | 7/2012 |
| CN | 102771054 | 11/2012 |
| CN | 103782557 | 5/2014 |
| EP | 0700155 | 3/1996 |
| EP | 1300958 | 4/2003 |
| EP | 2779469 | 9/2014 |
| EP | 2779473 | 9/2014 |
| EP | 3070852 | 9/2016 |
| JP | H07235894 | 9/1995 |
| JP | 2009 522908 | 6/2009 |
| JP | 2009 526442 | 7/2009 |
| JP | 2011 509045 | 3/2011 |
| KR | 2001 0062968 | 7/2001 |
| KR | 10 0592595 | 6/2006 |
| KR | 10 1652624 | 8/2016 |
| WO | WO 2007 078032 | 7/2007 |
| WO | WO 2007 092767 | 8/2007 |
| WO | WO 2009 088787 | 7/2009 |
| WO | WO 2009 090400 | 7/2009 |
| WO | WO 2009 156510 | 12/2009 |
| WO | WO 2011 148341 | 12/2011 |
| WO | WO 2016043830 | 3/2016 |

OTHER PUBLICATIONS

Aparin, et al., Analysis and Reduction of Cross-Modulation Distortion in CDMA Receivers, IEEE Transactions on Microwave Theory and Techniques, 51 (5), (May 2003), 1591-1602.

Araseki, T., "A Frequency Domain Adaptive Loop Canceller for Digital Terrestrial Broadcasting Systems", The Journal of the Institute of Image Information and Television Engineers, vol. 56, No. 8, pp. 1342-1348, Aug. 1, 2002, Japan.

Bellanger et al., "TDM-FDM Transmultiplexer: Digital Polyphase and FFT," IEEE Transactions on Communications, 22(9), (Sep. 1974), 1199-1205.

Cruz et al., "Receiver Front-End Architectures—Analysis and Evaluation", Advanced Microwave and Millimeter Wave Technologies Semiconductor Devices Circuits and Systems, Mar. 2010.

Harris et al., "Digital receivers and transmitters using polyphase filter banks for wireless communications," Microwave Theory and Techniques, IEEE Transactions on , vol. 51, No. 4, pp. 1395-1412, Apr. 2003.

Kim et al., "Implementation of a High-Throughput Low-Latency Polyphase Channelizer on CPU's," EURASIP Journal on Advances in Signal Processing, vol. 2014:141, (Mar. 2014), 1-10.

Multirate and Adaptive Filter, JJ Shynk—Signal Processing Magazine, IEEE, 1992.

Navarro et al., "Efficient Channelization for PMR+4G and GSM Re-Farming Base Stations," Signals and Systems Conference (ISSC 2012), Maynooth, Jun. 28-29, 2012, (Jun. 2012), pp. 1-6.

Navarro, Alvaro Palomo, "Channelization for Multi-Standard Software-Defined Radio Base Stations", A thesis presented to NUI Maynooth, Oct. 2010.

Omer et al., "A PA-Noise Cancellation Technique for Next Generation Highly Integrated RF Front-Ends" 2012 IEEE Radio Frequency Integrated Circuits Symposium, pp. 471-474.

Rashid-Farrokhi et al., "Transmit Beamforming and Power Control for Cellular Wireless Systems," IEEE Journal on Selected Areas in Communications, vol. 16, No. 8, Oct. 1998, pp. 1437-1450.

Taiwanese Office Action dated Dec. 9, 2016 for Taiwan Patent Application No. 105102010, 9 pages and 7 page translation.

Amin, "Transmit and Receive Crosstalk Cancellation," International Conference on Emerging Technologies, 2010 6th International Conferences on Emerging Technologies, pp. 210-215.

Aparin, et al., "Analysis and Reduction of Cross-Modulation Distortion in CDMA Receivers," IEEE Transactions o Microwave Theory and Techniques, vol. 51 (5), (May 2003), pp. 1591-1602.

Araseki, et al., "A Frequency Doman Adaptive Loop Canceller for Digital Terrestrial Broadcasting Systems," The Journal of the Institute of Image Information and Television Engineers, vol. 56, No. 8, pp. 1342-1348, Aug. 1, 2002, Japan.

Bellanger, et al., "TDM-DFM Transmultiplexer: Digital Polyphase and FFT," IEEE Transactions on Communication, vol. Com-22, No. 9, Sep. 1974, pp. 1199-1205.

Kim, et al., "Implementation of a high-throughput low-latency polyphase channelizer on GPUs," Kim and Bhattacharyya EURASIP Journal on Advances in Signal Processing 2014, 2014:141.

Navarro, Alvaro Palomo, "Channelization for Multi-Standard Software-Defined Radio Base Stations", A thesis presented to NUI Maynooth, Oct. 2011.

(56) References Cited

OTHER PUBLICATIONS

Navarro, et al., "Efficient Channelization for PMR+4G and GSM Re-Farming Base Stations," Signals and Systems Conference (ISSC 2012), Maynooth, Jun. 28-29, 2012, (Jun. 2012), pp. 1-6.
Omer, et al., "A PA-Noise Cancellation Technique for Next Generation Highly Integrated RF Front-Ends," IEEE Radio Frequency Integrated Circuits Symposium, 2012, pp. 471-474.
Rashid-Farrokhi, et al., "Transmit Beamforming and Power Control for Cellular Wireless Systems," IEEE Journal on Selected Areas in Communications, vol. 16, No. 8, Oct. 1998, pp. 1437-1450.
Shynk, "Frequency-Doman and Multirate Adaptive Filtering," IEEE SP Magazine, Jan. 1992.
European Application Serial No. 1619554.1, Extended European Search Report dated Aug. 1, 2016, 8 pages.
Office Action dated Nov. 24, 2017 for counterpart Chinese Patent Application No. 201610152668.7, 10 pages.
German Office Action dated Nov. 4, 2016 for German Patent Application No. 10 2016 104 467.9.

\* cited by examiner $$\theta_{new} = \theta_{old} + \mu\{ R_0 + \lambda I \}^{-1} c_0$$

METHOD OF AND APPARATUS FOR TRANSMIT NOISE REDUCTION AT A RECEIVER

CROSS-REFERENCE TO RELATED APPLICATION

This application claims the benefit of priority under 35 U.S.C. § 119(e) of U.S. Provisional Patent Application No. 62/136,301, filed Mar. 30, 2015 and titled "METHOD OF AND APPARATUS FOR TRANSMIT NOISE REDUCTION AT A RECEIVER," the entire disclosure of which is hereby incorporated by reference in its entirety herein.

FIELD

This disclosure relates to a method of, and apparatus for, estimating and reducing the impact of unwanted signal components leaking from a transmitter to an associated receiver. Embodiments of this disclosure also provide relatively good performance in the presence of other transmitters that have a significant signal strength at the receiver.

BACKGROUND

Communication devices, such as mobile telephones, tablets, computers or the like, may perform wireless communication with a remote node in order to exchange information therewith. Early communication systems operated in a time multiplexed manner such that if a transmitter device was on, then its receiver was off. This approach simplified transmitter and receiver design but was an inefficient use of bandwidth and/or data throughput. The desire to use bandwidth more efficiently and/or increase data throughput has resulted in radio and data communications systems moving towards duplex operation and multi-channel operation. As a result, for a transmitter and receiver pair, commonly referred to as a transceiver, the transmitter may be transmitting concurrently with the receiver seeking to receive a signal from a physically remote transmitter. The transmitter and the receiver may be operating concurrently at different frequencies separated by a "duplex frequency". Such systems are known as Frequency Division Duplex (FDD) systems. Alternatively, in a full duplex system, the transmitter and receiver may operate concurrently at the same or substantially the same frequency. Under such circumstances, the signal from the transmitter of the transceiver may have a power at the receiver of the transceiver which is much greater than that of a wanted signal or wanted signals from one or more remote transceivers.

It is known that isolators and filters, optionally with the use of multiple antennas, can be used to reduce leakage from a transmitter of a transceiver to the associated receiver of the transceiver. However, these components still allow appreciable amounts of power to appear at the radio frequency (RF) front end of the receiver. This leakage can include the data being transmitted by the transmitter, and noise from the transmitter. The data is constrained into well-defined frequency bands known as channels. The noise can be wideband and can leak into channels that the receiver is seeking to recover data from. Wide band noise from the transmitter power amplifier can degrade the receiver's sensitivity. Wideband transmitter noise can also leak into the receiver in frequency division duplex systems.

Even in systems where the transmitter should notionally be "off" whilst a receiver is "on", "off" may mean in a quiescent state rather than fully depowered and hence residual noise may still leak from the transmitter to the receiver.

SUMMARY OF CERTAIN INVENTIVE ASPECTS

According to a first aspect of this disclosure there is provided a method of reducing the impact of transmitter noise leaking into a receiver associated with the transmitter. The method includes estimating filter coefficients for a filter that is used to inject a filtered version of the signal from the transmitter into the receiver so as to reduce the impact of transmitter noise at the receiver. In order to do this, the method comprises updating the filter coefficients using an update process which weights the estimates of noise on a channel by channel basis. The filter is shared by a plurality of channels. Channels on which the transmitter of the transceiver is active are given greater significance in the update process.

This weighting can allow transmitter noise from the transmitter of the transceiver to be identified and accounted for without the update process being adversely impaired by signals from other transmitters. This is relevant because such unwanted signals from other transceivers can appear as noise in the receiver and can degrade the adaptation process.

According to a second aspect of the present disclosure there is provided a noise reduction apparatus adapted to perform the method according to the first aspect of this disclosure. The method can give the apparatus robustness in the face of interfering signals, such as unwanted signals arriving from other transmitters or transceivers at the receiver. There is also provided a transceiver including the noise reduction apparatus.

BRIEF DESCRIPTION OF THE DRAWINGS

Embodiments of methods and apparatus in accordance with the teachings of this disclosure will now be described, by way of non-limiting example, in which.

DETAILED DESCRIPTION OF CERTAIN EMBODIMENTS

Figure 1:
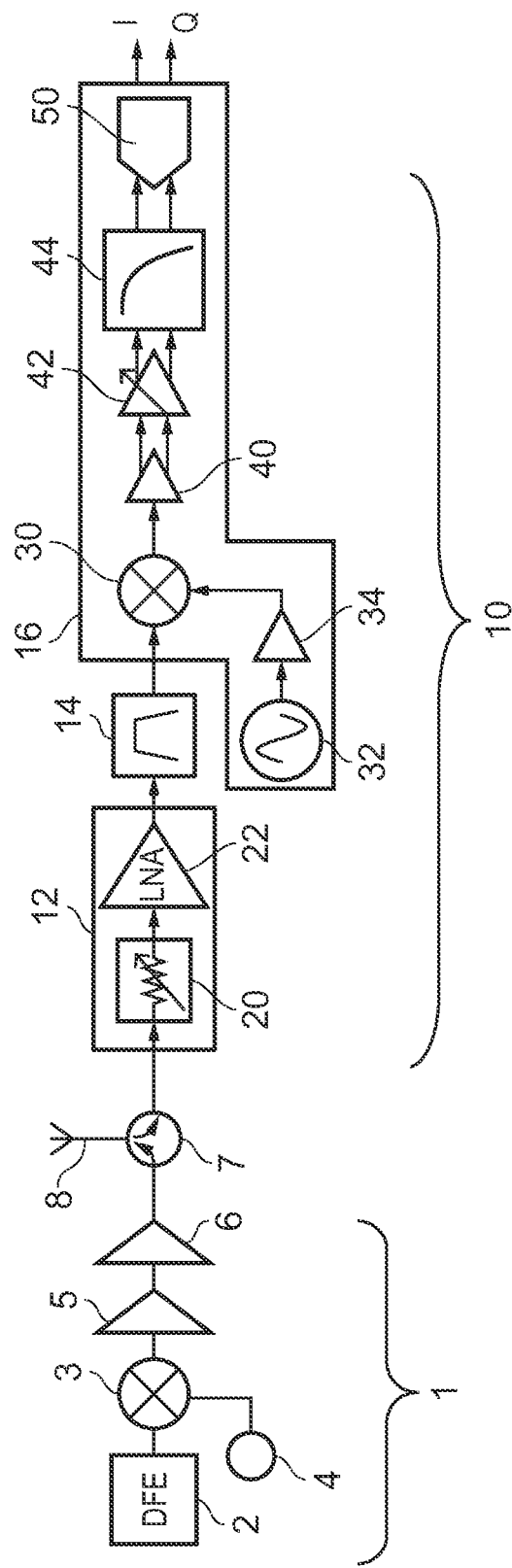
FIG. 1 is a block diagram of a transceiver that may be used in a telecommunications system.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

There is a general desire to move towards increasing levels of transceiver integration. As such, more and more functionality is being provided within decreasing numbers of integrated circuits. Examples of systems where such cost pressure is evident are mobile communication systems for connection to mobile data and voice infrastructure. Examples of such devices are mobile telephones, but other devices such as data modems, smart meters, tablets, to name just a few applications, also participate in such networks.

By way of background, a transceiver including a low intermediate frequency (IF) or direct conversion receiver will now be described. However, the teachings described herein are not limited to such receiver architectures and can be applied to any other suitable receiver architectures.

FIG. 1 schematically illustrates a transceiver which comprises a transmitter portion 1 and a receiver portion 10. The transmitter portion 1 comprises a digital front end (DFE) 2 which receives data, for example, from a modem, keyboard, touch screen or microphone amongst other examples, digitizes the data, and encodes the data, for example using spreading codes as known to the person skilled in the art of telecommunications. The digital data from the digital front end is then converted to the analog domain by a digital to analog converter associated with or included in the digital front end and sent to an up converter comprising a quadrature mixer 3 and a local oscillator 4. The up converted data is then subjected to gain by an amplifier 5 and a power amplifier 6 before being sent to a circulator 7 which directs the RF signal towards an antenna 8 for transmission.

As the transceiver can be operated in a duplex mode, the receiver can be operational concurrently with the transmitter. In use, signals received at the antenna 8 are directed by the circulator 7 towards an RF front end 12. An output from the RF front end 12 passes to a bandpass filter 14 in order to remove out of band signal noise, and then to a demodulator 16.

The RF front end 12 comprises a variable attenuator 20 and low noise amplifier 22. The variable attenuator 20 is provided in order to stop the input stage of the low noise amplifier 22 from being saturated in the presence of a strong incoming signal, as might be the case if the transceiver is close to another transceiver operating in the same frequency range. If the low noise amplifier 22 were to become saturated, then the receiver would start to introduce significant distortion into the received signal, which may degrade and eventually inhibit reception of the wanted signal. The amplified and filtered signal is provided to the demodulator 16 where the incoming RF signal is down converted at a mixer 30 by mixing it with a signal from a local oscillator 32, which is provided to a local oscillator input of the mixer 30 optionally by way of a buffer 34. The local oscillator 32 may be set to a local oscillator frequency such that the incoming signal is down converted to an intermediate frequency, a low intermediate frequency, or directly to baseband. This process is known to the person skilled in the art and need not be described further.

The output of the mixer 30 is provided to an amplifier 40 and then to a variable gain amplifier 42 for amplification prior to being provided to a low pass filter 44, which seeks to remove out of band noise. Finally, the filtered signal is provided to an analog to digital converter (ADC) 50 for conversion into the digital domain. The output of the ADC 50, which is digital data representing the I and Q channels from the quadrature demodulator, is then provided to subsequent processing circuitry in order to recover the code spread wanted data and to process and output the data in a desired format.

The circulator 7, or other forms of transmitter to receiver isolation, such as use of respective antennas, do not typically provide complete isolation between the output of the power amplifier 6 of the transmitter portion 1 and the receiver portion 10. As a result, some of the transmitted power from the transmitter can leak into the receiver. This leakage signal from the transmitter to the receiver can be considered as comprising two parts. A first part can be the signal transmitted by the transmitter section. A second part can be noise associated with the amplifiers of the transmitter section, and in particular the amplifier 5 and the power amplifier 6. The noise can be wide band and may spread across the entirety of the receive band of the receiver portion 10. This disclosure provides techniques for reducing the impact of the noise from the transmitter. The duplex mode may be a frequency division duplex mode where the transmitter and receiver operate concurrently but at different frequencies, although the frequency separation may be small. In such frequency division duplex schemes, the "in-band" interference at the receiver from the associated transmitter should only be transmitter noise and possibly intermodulation products. However, the teachings of this disclosure can also be applied to duplex systems where the transmitter and the receiver operate concurrently and at approximately the same frequency. Such systems are known as full duplex systems. In such schemes, the transmitted signal can also interfere with reception of the received signal.

In order to reduce the impact of leakage from the transmitter to the associated receiver of a transceiver, a leakage compensation circuit can be provided, as will be discussed with respect to FIG. 2. For diagrammatic ease, certain parts of the receiver have been omitted in FIG. 2, such as the amplifiers 40 and 42, although it is to be understood that in reality they may still be interposed between the mixer 30 and the low pass filter 44. Furthermore, it will be assumed that signals from the power amplifier 6 will be directed to the antenna 8 by a combined signaling and isolation block 9, and that signals from the antenna 8 will be diverted to the RF front end 12 by the filtering and isolation block 9. Furthermore, the filter and isolation block 9 can act to limit signal transfer directly from the output of the power amplifier 6 to the input of the RF front end 12 and may include a circulator. Although the filtering and isolation block 9 has been shown as being associated with a single antenna 8, this is for diagrammatic representation only and a single or multiple antennas may be provided. The filtering and isolation block 9 can be a duplexer.

The signal received by the receiver can comprise two parts. The first part is the wanted signal from the remote transmitter, and the receiver circuitry described thus far has no knowledge about the form of that signal other than its potential frequency range. The second part of the signal received at the receiver can be the leakage from the transmitter. It follows that the receiver can obtain full knowledge about the signal from the transmitter by taking a copy of it using an observation channel. Thus the cancellation system generally operates by using a coupler 60 to tap off part of the signal at the output of the power amplifier 6. This signal is then processed in the observation channel in a way that is analogous to a processing applied to the wanted signal. Thus, in FIG. 2, the signal from the coupler 60 is bandpass filtered by filter 14a which is analogous the filter 14, then down converted at mixer 30a which is analogous to the mixer 30. The output from the mixer 30a is filtered by filter 44a which substantially matches the characteristics of filter 44, and then digitized by analog to digital converter 50a. The output of the analog to digital converter 50a, which is a digital representation of the component that leaks through from the transmitter is then provided to a transmit noise cancellation system 70, which may also be known as a transmit noise reduction system, which re-injects a filtered version of the transmitter signal in order to remove the effect of the leaky transmitter signal from the wanted signal received at the receiver. Such a system has been described in European Patent Application No. 2779473, which is hereby incorporated by reference in its entirety, where a plurality of cancellation systems are provided in parallel, each one working on a respective channel. If the cancellation is incomplete, then the transmitter noise is reduced, which is still a benefit.

It can be desirable to be able to provide a robust and flexible system for reducing the effect of transmitter leakage. It can also be desirable that such a system should be largely or totally transparent to a system designer. It may also be desirable for a system designer to have a choice as to whether to implement the leakage reduction system directly in the receiver architecture, thereby isolating it from the post receiver digital processing circuitry after the so called receiver digital front end, or to be able to include it within the receiver digital front end.

In order to correctly adapt the filter used to reject the cancellation signal, the transmitter noise cancellation system 70 can compare the incoming signal from the ADC 50 with the observed transmitter signal provided to it by the ADC 50a. These signals may then be correlated with one another in order to determine the correct coefficients for a filter, such as a finite impulse response (FIR) filter to re-inject the correction signal. This form of circuitry may also be used to reduce the effects of non linearities in the receiver processing stage, for example, second harmonic generation due to second order terms in the transfer characteristic of the receiver.

When the adaptation system relies on comparing the known leakage signal with the unknown received signal which comprises a leakage signal portion, its performance can be adversely impacted by the presence of powerful "blocker" signals resulting from nearby communications devices. These blocker signals can be relatively narrow band, but can appear as powerful bandwidth limited noise.

Figure 2:
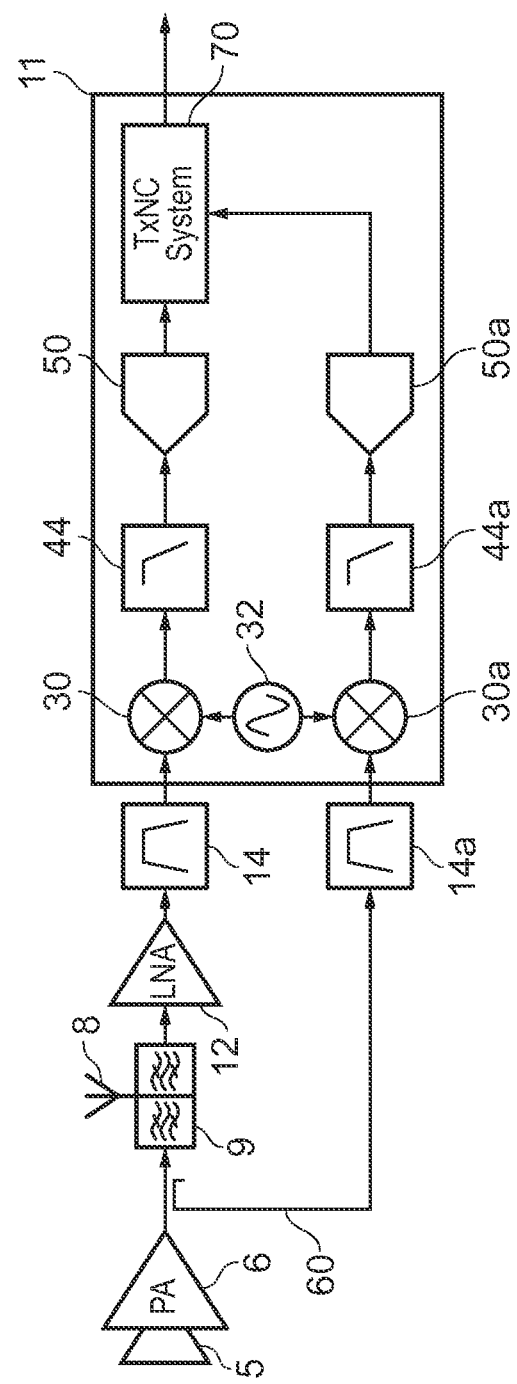
FIG. 2 is a block diagram of a transceiver according to an embodiment of this disclosure.
Figure 3:
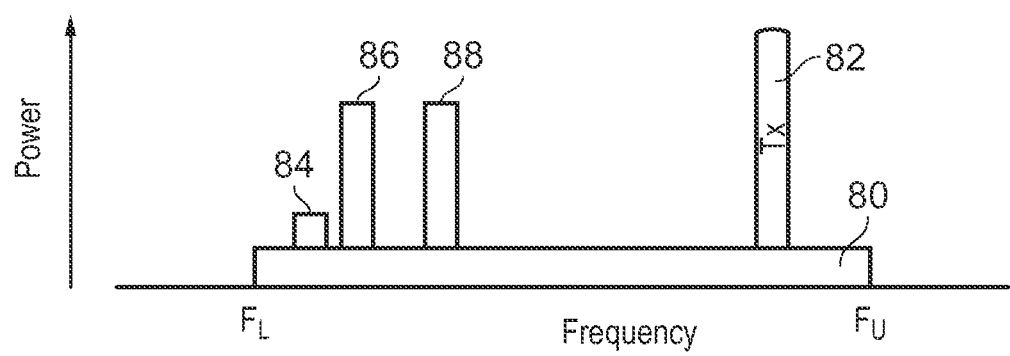
FIG. 3 is a representation of a power versus frequency plot for signals at an RF front end of the receiver of the transceiver of FIG. 2.

Such an arrangement is schematically shown in FIG. 3, which illustrates a power spectrum at the RF input 12 of the receiver of FIG. 2. The input signal is assumed to have been bandwidth limited to a receiver operating bandwidth extending between frequencies $F_L$ and $F_U$ representing lower and upper operating frequencies, respectively. Noise that leaks through from the power amplifier 6 of the transmitter can form a substantially constant noise signal 80 at the front end of the receiver. The bandwidth limited transmitted data signal from the transmitter is represented as signal 82, which stands out from the noise 80. The receiver may be seeking to receive a wanted signal, designated 84, which may have a receive power at the receiver which is significantly less than the leakage from the transmitter, but which is distinguishable therefrom by virtue of being separated in frequency. Other signals 86 and 88 from other devices may appear in the frequency spectrum at the input to the receiver. The noise 80 can act as an interferer or blocker that makes reception of the wanted signal 84 more difficult. The impact of this noise is reduced by the transmit noise cancellation system 70. However, the signals 86 and 88 are uncorrelated with the noise 80, and from the perspective of the transmit noise cancellation system 70, the signals 86 and 88 represent noise that inhibits the noise reduction system from identifying the signal 80. It is therefore beneficial to remove the signals 86 and 88 from interfering with the adaption process executed by the transmit noise cancellation system 70.

Figure 4A:
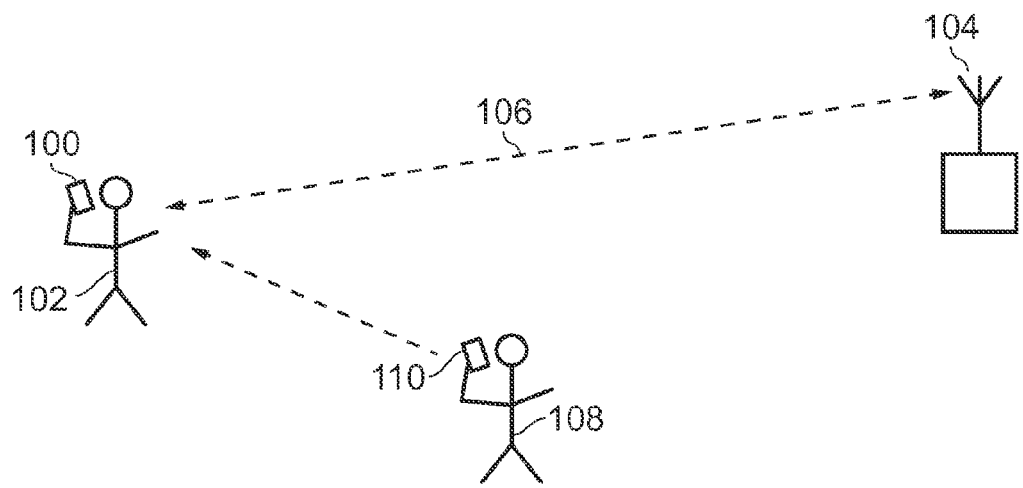
FIGS. 4a and 4b illustrate how blockers may rapidly appear and disappear at the transceiver.
Figure 4B:
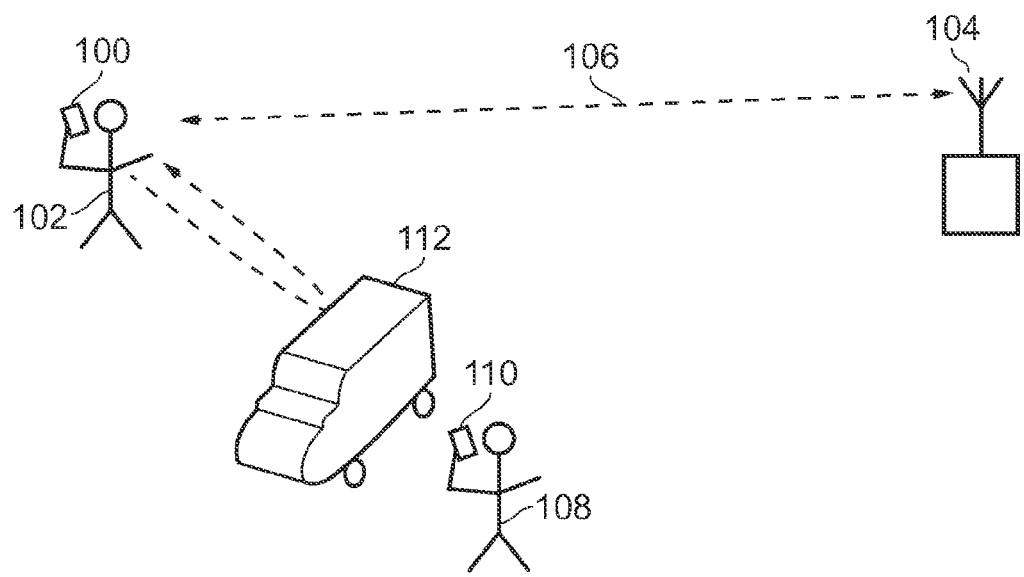

The transmit noise cancellation system 70 may run relatively frequently, as the effective noise which includes the blockers 86 and 88 can vary rapidly. In order to put this in context, consider the situations shown in FIGS. 4a and 4b. In each case a telecommunications device, such as a mobile phone 100 being used by a first individual 102 is communicating with a remote transceiver, such as the base station 104. Duplex communication occurs between the mobile phone 100 (e.g., a smart phone) and the base station 104 as indicated by double headed chain line 106. A second person 108 with mobile phone 110 (e.g., a smart phone) may be sending data to the base station 104 on a nearby channel of the telecommunication network. Transmissions from the mobile phone 110 may appear as one of the blockers 86 and 88 when viewed from the standpoint of the mobile phone 100. The users 102 and 108 may be located very close to one another, for example, on opposing sides of a carriageway. Traffic progressing along the carriageway, such as a vehicle 112 may briefly pass between the users 102 and 108. Such a situation is shown in FIG. 4b. During the time that the vehicle 112 passes between the users 102 and 108, the blocking signal from the mobile phone 110 is attenuated or removed completely from the point of view of the mobile phone 100. However, the vehicle 112 may also act as a reflector returning some of the transmitted signal 82 back to the mobile device 100, with a delay due to transit time, and possibly a frequency shift due to Doppler Effect depending on the precise direction of movement of the vehicle 112 with respect to the mobile phone 100. Once the vehicle 112 is no longer between the users 100 and 108, the signal from, the mobile phone 110 reappears as a significant blocker. Furthermore, if a passenger within the vehicle 112 is using a telephone, then the passenger's device may appear as a new blocker elsewhere in the frequency spectrum. It can be seen that the RF environment at a transceiver can change rapidly.

Figure 5:
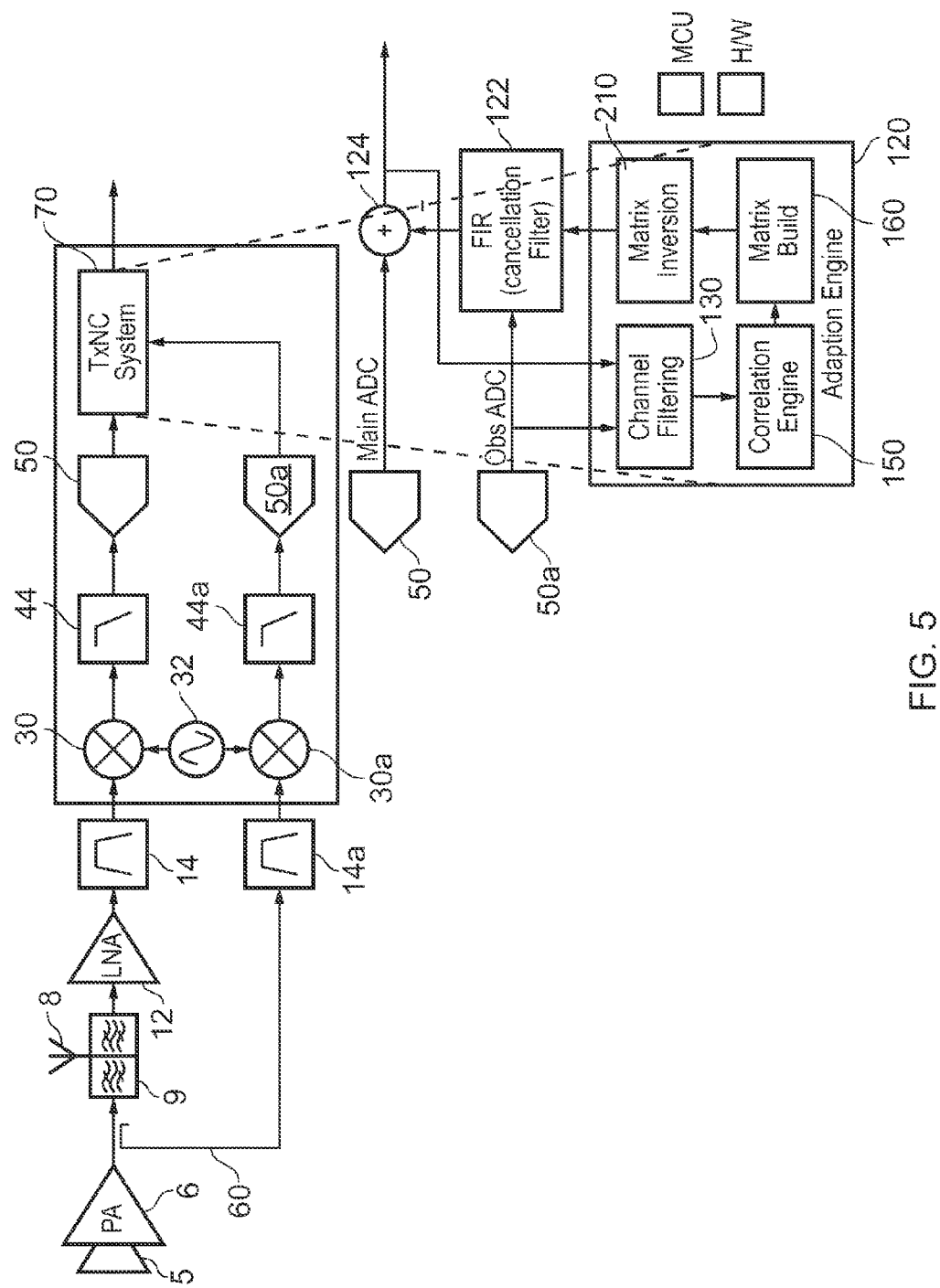
FIG. 5 shows the components of the transmitter noise cancellation system of FIG. 2 in greater detail according to an embodiment of this disclosure.

FIG. 5 repeats the diagram of FIG. 2, but shows the components and interconnections within the transmit noise cancellation system 70 in greater detail and in accordance with an embodiment of this disclosure. The illustrated transmit noise cancellation system 70 comprises an adaptation engine 120 which controls the filter characteristics of a finite impulse response (FIR) transmitter noise cancellation filter 122. The FIR transmitter noise cancellation filter 122 receives the output of the ADC 50a, filters it to create a correction signal, and then provides the correction signal to a subtractor 124 which combines the correction signal with the output of the receiver at ADC 50 to further remove the influence of transmitted leakage from the received signal. At this point the signals are in the digital domain so the FIR transmitter noise cancellation filter 122 and the subtractor 124 can be implemented in digital hardware.

As shown in FIG. 5, the adaptation engine 120 may be regarded as performing four discrete tasks, namely channel filtering with a channel filtering block 130, correlation within a correlation engine 150, a matrix build operation with a matrix and vector build engine 160, and a matrix inversion operation with a matrix inversion engine 210 in order to calculate and update the filter coefficients for the FIR transmitter noise cancellation filter 122. Advantageously, these processes can be split between dedicated hardware, and software running on a multipurpose computing unit (such as a programmable data processor or a microcontroller core). The processing operations of channel filtering and performing a correlation can be performed often or near continuously at a relatively low cost on dedicated hardware. The matrix build and matrix conversion as part of the update process may occur less frequently and hence these tasks can economically be handled by computing resources that are already embedded within the receiver architecture and/or the digital front end, or which could be added to the receiver architecture specifically for this task.

Figure 6:
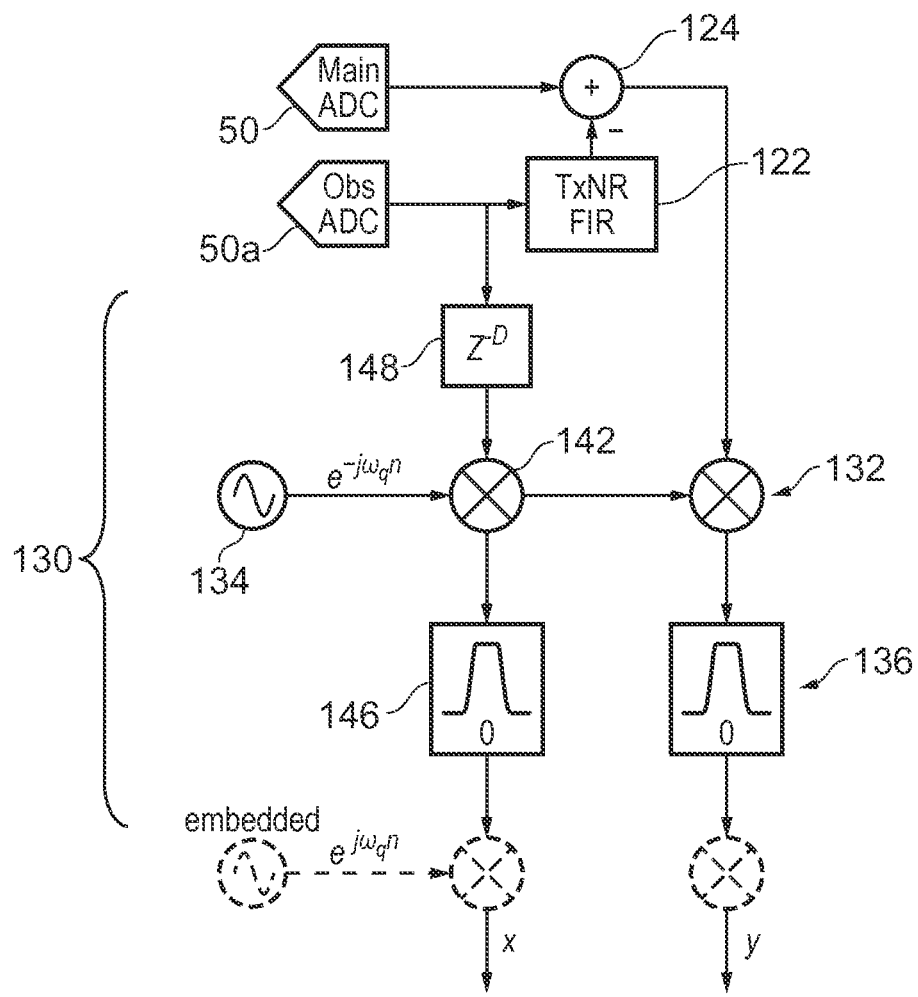
FIG. 6 schematically illustrates a hardware implementation of the channel filtering block of FIG. 5 according to an embodiment of this disclosure.

The channel filtering block 130 according to an embodiment is shown in more detail in FIG. 6. The illustrated channel filtering block 130 receives a receiver signal from the output of the digital subtractor 124. This is provided to a mixer 132 (e.g., a digital multiplier) which receives a digital representation of a sinusoid from a digital local oscillator 134. The digital local oscillator 134 is sequentially tuned to each channel, or to each active channel, to select data from that channel for presentation to a low pass filter 136. Thus the digital local oscillator 134 in combination with the digital mixer 132 and the digital low pass filter 136 acts to perform the function of a tunable band pass filter. Similarly, the leakage signal from the power amplifier, as output in digital form by the observation ADC 50a is provided to a digital mixer 142 which corresponds to the mixer 132 and then to a digital filter 146 which is substantially identical to the filter 136. The mixer 142 is also driven by the digital local oscillator 134. A digital delay 148 is interposed in the signal path between the observation analog to digital converter 50a and the mixer 142 in order to compensate for the delay through the transmitter noise cancellation FIR filter 122 so as to bring the signals into temporal alignment.

The digital local oscillator 134 can, if desired, be implemented with relatively low resolution, and in the limit may effectively output a square-wave. The digital multipliers 132 and 134 can observe as much of the output ADC output words as necessary in order to adapt the filter 122 to a sufficient accuracy as desired by the system designer. Thus the multipliers 132 and 142 need not necessarily accept the entirety of the input word and could be blind to the least significant bits from the ADC 50 and the ADC 50a, respectively. However, for convenience, it will be assumed that they accept the full output word from the ADCs 50 and 50a. The output from the multipliers 132 and 142, which may itself be truncated to limit the data width, is provided to the filters 136 and 146, respectively. The filters 136 and 146 are not directly in the receiver output path, and consequently do not need to be high quality filters. Thus they can be implemented in the digital domain using relatively short filters. Furthermore, the pass band response of each filter is not particularly critical in the illustrated application. The filters 136 and 146 are designed to give relatively good stop band performance, and hence pass band performance can be traded for stop band performance. The primary purpose of each filter 136 and 146 is to reject off channel signals and to pass the active channel. Additionally, it can be desirable for the filters 136 and 146 to be well matched with each other. In practice, the filters 136 and 146 can be well matched when implemented digitally. The output of the filters 136 and 146 may be frequency converted to baseband if desired by further multiplication using a digital oscillator and mixers shown in FIG. 6 in broken outline. However, in practice this stage does not actually have to be performed in dedicated hardware as it can be virtualized into a software based matrix build stage implemented by a processor configured with specific executable instructions.

The digital local oscillator 134 may be operated such that it is only tuned to the channels which are presently active in the transceiver. Alternatively, the digital local oscillator 134 can be swept sequentially through all the available channels if it is desired to simplify this stage of the hardware by making it run automatically without the need to interface with downstream circuitry to know which channels are currently active.

Figure 7:
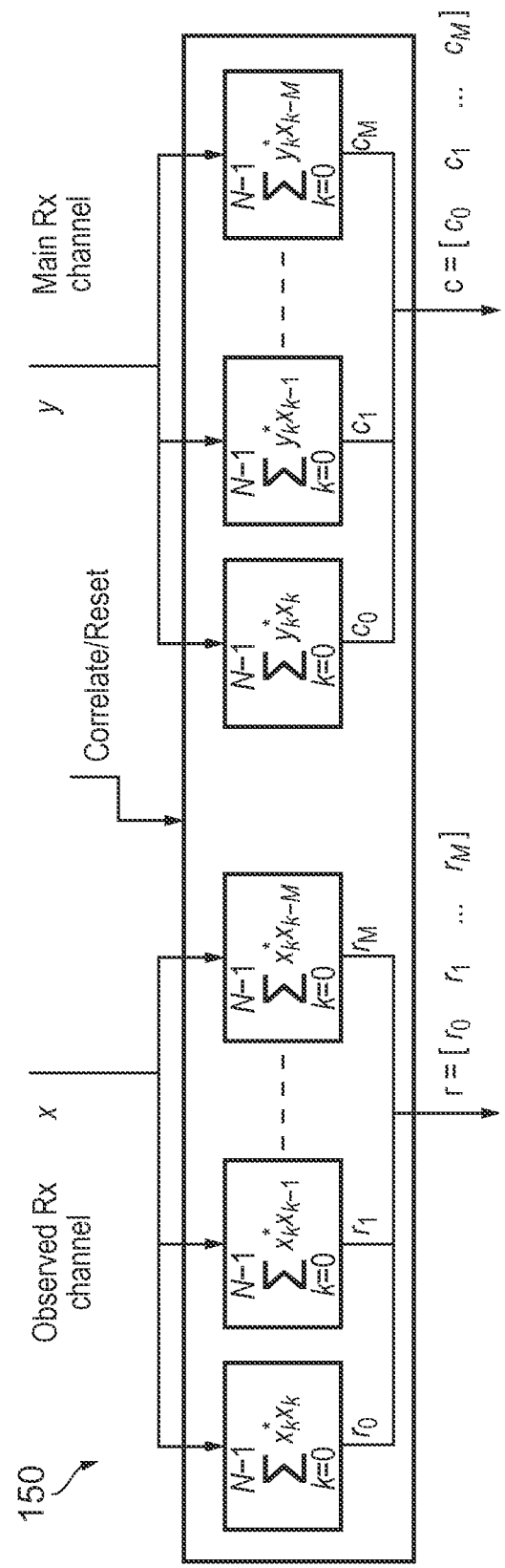
FIG. 7 schematically illustrates the processing operations taken in the correlation engine of FIG. 5 according to an embodiment of this disclosure.

The filtered outputs, designated X and Y in FIG. 6, are then provided to a correlation engine 150, an embodiment of which is shown in greater detail in FIG. 7. The correlation engine 150 may comprise a buffer or memory so as to hold N samples. In hardware the buffer may be implemented as an N stage shift register. Alternatively the correlation engine 150 can dispense with a buffer and process the sequence of digital samples as they arrive one by one. Each buffered value or sample may be provided to a plurality of multipliers and summers arranged to form the desired auto-correlation and cross correlation functions. The hardware implementation of multiply and accumulate (MAC) functionality is well known to the person skilled in the art and is not described here.

Thus, as shown in FIG. 7, the values from buffer or incoming data stream can be supplied to a series of multiplier and summers arranged to form auto-correlation products $r_0$ to $r_m$ $$r_0 = \sum_{K=0}^{N-1} x_K^* x_K$$

-continued $$r_1 = \sum_{K=0}^{N-1} x_K^* x_{K-1}$$

$$r_2 = \sum_{K=0}^{N-1} x_K^* x_{K-2}$$

$$\vdots$$

$$r_m = \sum_{K=0}^{N-1} x_K^* x_{K-m}$$

where * represents a complex conjugate

N represents the number of samples in the buffer m represents the number of taps/delay stages in the FIR filter Similarly, the cross correlation products can be formed by dedicated hardware (or by a processor configured to execute instructions stored in non-transitory computer-readable storage) configured to process the N samples to calculate cross-correlation coefficients $c_0$ to $c_m$ $$c_0 = \sum_{K=0}^{N-1} y_K^* x_K$$

$$c_1 = \sum_{K=0}^{N-1} y_K^* x_{K-1}$$

$$c_2 = \sum_{K=0}^{N-1} y_K^* x_{K-2}$$

and so on.

The output of the correlation engine 150 is an autocorrelation vector r and a cross correlation vector c where r=[$r_0$, $r_1$, $r_2$ . . . $r_m$]

c=[$c_0$, $c_1$, $c_2$ . . . $c_m$]

As shown in FIG. 7, the correlation engine 150 is responsive to an instruction to process N instructions, here labelled 0 to N−1.

Figure 8:
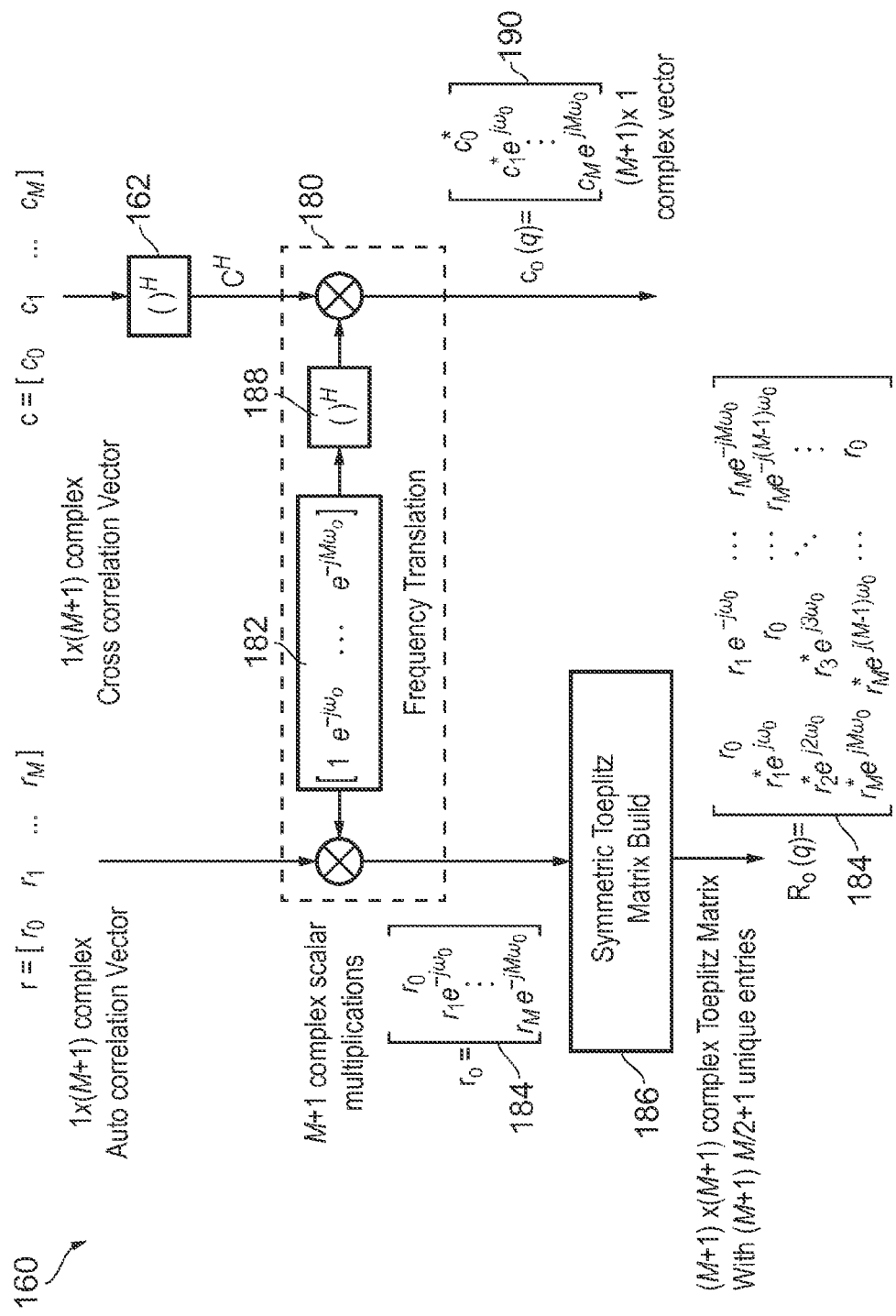
FIG. 8 schematically illustrates the processing operations taken in the matrix and vector build engine for each one of the Q channels.

FIG. 8 schematically illustrates the operations undertaken in an embodiment of the matrix and vector build engine 160.

As shown in FIG. 8, the matrix and vector build engine 160 receives the autocorrelation vector r and cross correlation vector c. The matrix and vector build engine 160 can operate on the received complex cross correlation vector to form a Hermitian matrix (also known as self-adjoint matrices) at block 162 where an element in the $I^{th}$ row and $J^{th}$ column of the matrix is equal to the complex conjugate of the element in the $J^{th}$ row and $I^{th}$ column of the matrix for all indices I and J. Hermitian matrices have eigenvalues that are always real. The Hermitian matrix and the autocorrelation vector are then frequency translated.

At frequency translation block 180, a frequency translation vector is defined as $\lfloor 1, e^{-j\omega_0} \ldots e^{-jM\omega_0} \rfloor$. The frequency translation vector 182 is multiplied with the autocorrelation vector to form a vector $r_0$ designated 184 in FIG. 8, and then built into a Toeplitz matrix, represented by matrix 186 in FIG. 8. Similarly, the frequency translation vector 182 is used to operate on the cross correlation products, but here its Hermitian matrix 188 is formed and this is multiplied with the Hermitian matrix of the cross correlation product formed at block 162 to form vector $c_0$, designated 190. The frequency translation operation resulting from use of the frequency translation vector takes the place of the up conversion discussed with respect to FIG. 6, and allows a real time complex multiplication to be replaced with a relatively low rate (e.g., around once per millisecond) offline calculation.

The values $R_{0(q)}$ and $C_{0(q)}$ are formed for a qth channel. For simplicity it can be assumed that only the active channels have been processed, but if all channels were processed then the data from non-active channels can be weighted to zero significance and can be dumped, or could be multiplied by a weighting factor, to reduce its significance in the calculations. Such a multiplication by ½, ¼, ⅛ or so on can conveniently be achieved by shifting the data words several bits in a least significant direction in the data bus.

The values of $R_{0(q)}$ and $C_{0(q)}$ can be summed to form a $R_0$ and $C_0$ matrix and vector for processing in a matrix inversion engine, such as the matrix inversion engine 210 of FIG. 5. The values of $R_{0(q)}$, for each qth matrix can be sent to a matrix accumulator, which can be implemented by a processor executing specific instructions stored in non-transitory computer storage, where starting from a zero valued matrix, each element therein added to the corresponding value of that element in $R_{0(q)}$ and the sum written back to $R_0$, and this is repeated until all q matrices in the update cycle have been processed.

Similar processing operations can be taken for the vector summation process. The formation of $R_0$ and $C_0$ is schematically illustrated in FIG. 9 where a computation engine 200 provided as part of the matrix build engine 160 performs the summation steps represented as add and re save processes 201 and 202.

Figures 9, 10:
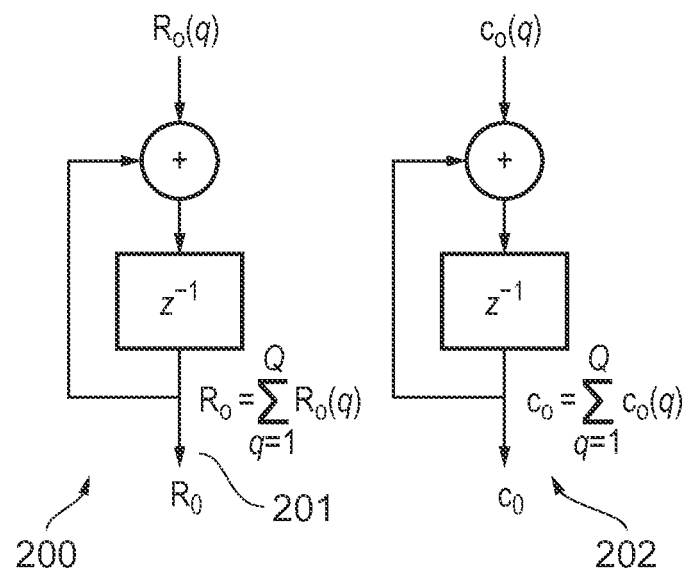
FIG. 9 schematically illustrates the processing operations to sum the results from investigation of each of the Q channels to form data for use to modify the filter coefficients of the signal injection filter.
FIG. 10 is an equation for the matrix update process used to modify the coefficients on the complex FIR filter.

The vector $C_0$ and the matrix $R_0$ are then passed to the matrix inversion/least squares engine 210, which performs an iterative estimate of the filter coefficients $\theta_{new}$ by updating old values of the filter coefficients with correction values formed by inverting the regularized autocorrelation matrix $\{R_0+\lambda I\}$ where $\lambda$ (lambda) is a scalar real constant and I is the identity matrix of dimension M+1, and premultiplying this inverse by the cross correlation vector $c_0$, and the result being scaled by a real positive scalar value $\mu$ as shown in FIG. 10. The value of $\mu$ allows the rate of convergence to be controlled so as to maintain stability. Such a technique is well known to the person skilled in the art and available via standard numerical packages, such as Matlab, and also in libraries for use with embedded systems. The starting value $\theta_{old}$ may be set to an initial value read from memory.

Figure 11:
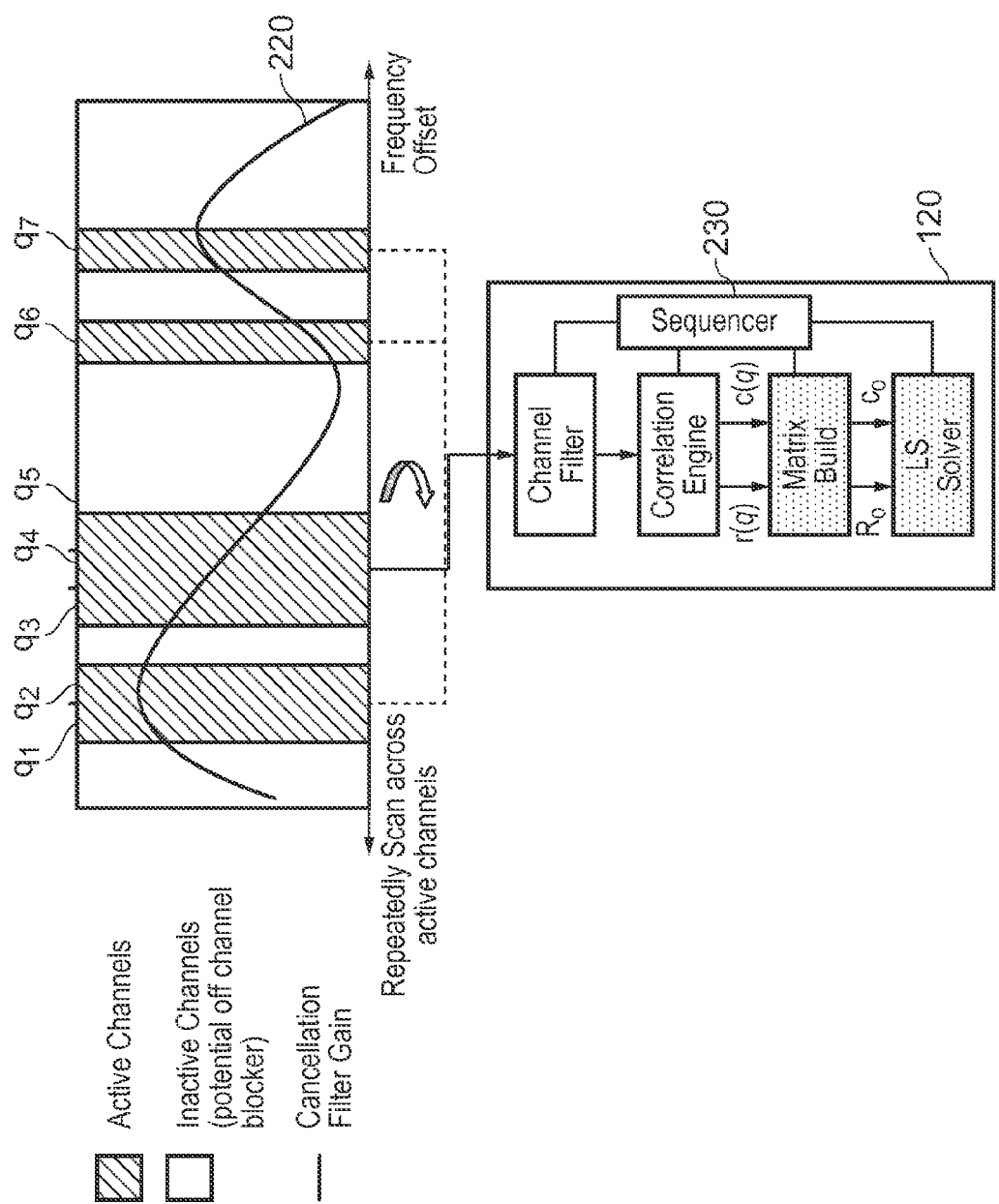
FIG. 11 schematically illustrates the update sequence applied to a plurality of active channels of the transceiver.

FIG. 11 schematically illustrates the operation of the adaptation process which has been described. In FIG. 11, the line 220 represents the cancellation filter response that, for the prevailing operating conditions, represents the optimal response of the cancellation filter in order to reduce leakage from the transmitter into the receiver of the transceiver. The transmitter may be operative on several active channels within the allocated frequency spectrum, as might be the case where the transmitter is employing orthogonal frequency division multiplexing techniques and/or where the transceiver is involved in simultaneous communication with multiple remote devices. Examples of such situations occur in telecommunications base stations or telecommunications access points. In the specific example shown in FIG. 11, there are four generally active regions in the frequency domain, which could represent four channels of various widths or taking each channel to have the same bandwidth, it can be seen that there are seven active channels for the example of FIG. 11. In use, a sequencer 230 within the adaptation engine 120 controls the channel filter, correlation engine, and matrix builder such that for each update sequence each one of the q active channels q1 to q7 (if the channels are the same width) is selected by varying the frequency of the digital local oscillator 134 (e.g., as shown in FIG. 6) to select qth channel and then for the selected channel the autocorrelation and cross correlation vectors are built. These vectors are then passed to the matrix build engine to build the matrix and vector contributions for that qth channel. Once this has been achieved the sequencer 230 instructs the channel filter to select the next active channel. The process is repeated for each of the active channels q1 to q7 in order to build a full band correlation matrix and vectors $R_0$ and $C_0$ which are then used in the matrix solving engine. The matrix solving engine (i.e. the matrix inversion engine) is arranged to derive modified filter coefficients for the finite impulse response filter 122 which acts on the output of the ADC 50a to filter its output and then to inject the filtered output into the main data path in order to reduce the effects of leakage from the transmitter.

This update sequence can then be repeated at a desired repetition rate or upon demand where external triggers occur which might require an update to be performed more rapidly than was otherwise scheduled.

It can be observed that the effective noise power introduced into the adaptation engine is reduced because any noise occurring in the inactive channels which may include off channel blocker signals from adjacent transmitters is not introduced into the updating process.

Figure 12A:
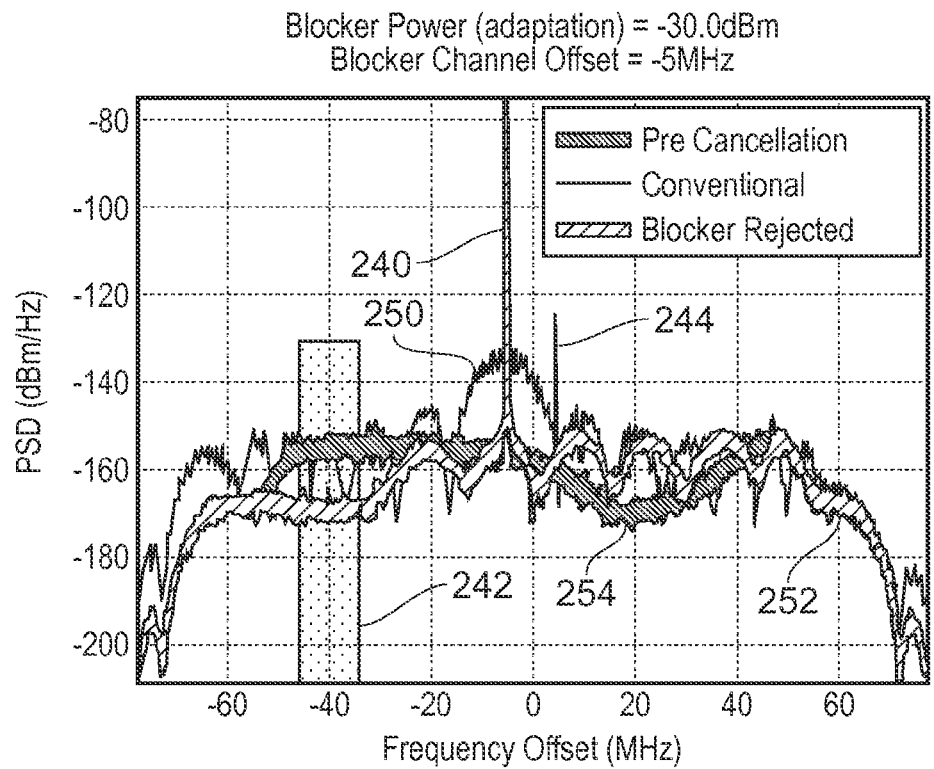
FIGS. 12a and 12b show power spectral density at an output of a receiver and filter frequency response for known adaption systems and an adaption system in accordance with the teachings of this disclosure, respectively, in the presence of a single blocker.
Figure 12B:
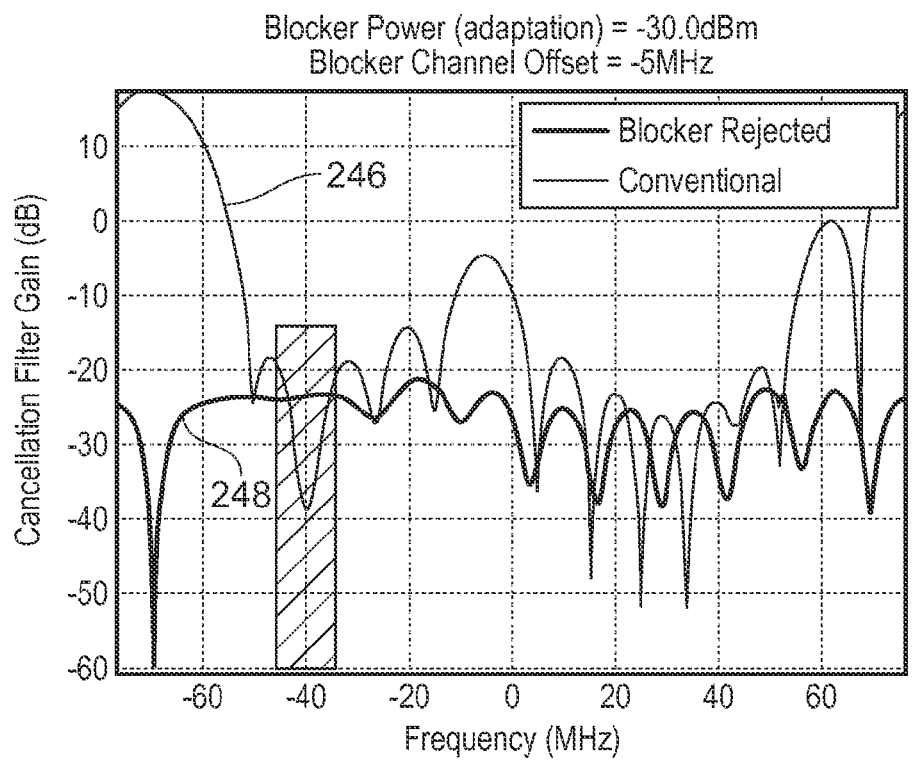

FIGS. 12a and 12b compare the power spectral density in a receiver as a function of frequency offset from the active channel of the receiver, showing the response of prior art systems and system in accordance with the teachings of this disclosure, and FIG. 12b shows the filter response as a function of frequency offset from the channel frequency for conventional filters and one updated in accordance with the teachings of this disclosure. Specifically, FIG. 12a shows a situation where a nominal receiver frequency 242 has been set to coincide at −40 MHz in the frequency offset plot. An off channel blocker occurs at −5 MHz resulting from leakage through the circulator is indicated by line 240. A further unwanted blocker signal from a remote transmitter is indicated by line 244 in the plot and occurs at a frequency of approximately +5 MHz in this frequency offset plot.

Prior art adaption algorithms were unable to ignore the presence of the blocker 244 and consequently the filter coefficients were non-optimal. The filter frequency response from the prior art system is indicated by line 246 in FIG. 12b, whereas the desired response, as identified in accordance with the teachings of the present invention is identified by line 248 in FIG. 12b. Applying these different filter responses in the transmitter noise cancellation engine can result in different power spectral density outputs from the output of the subtractor 124 in FIG. 6, which represents the actual receiver output. Thus, using the prior art system the resulting power spectral density at the output of the receiver is indicated by line 250 in FIG. 12a compared to line 252 which shows the power spectral density response after using a filter updated in accordance with the teachings of the present disclosure. The line 252 results in a power spectral density which is less than the uncorrected power spectral density as indicated by line 254 in the active channel, whereas the prior art technique can actually introduce more noise into some parts of the frequency spectrum but less in others.

Figure 13A:
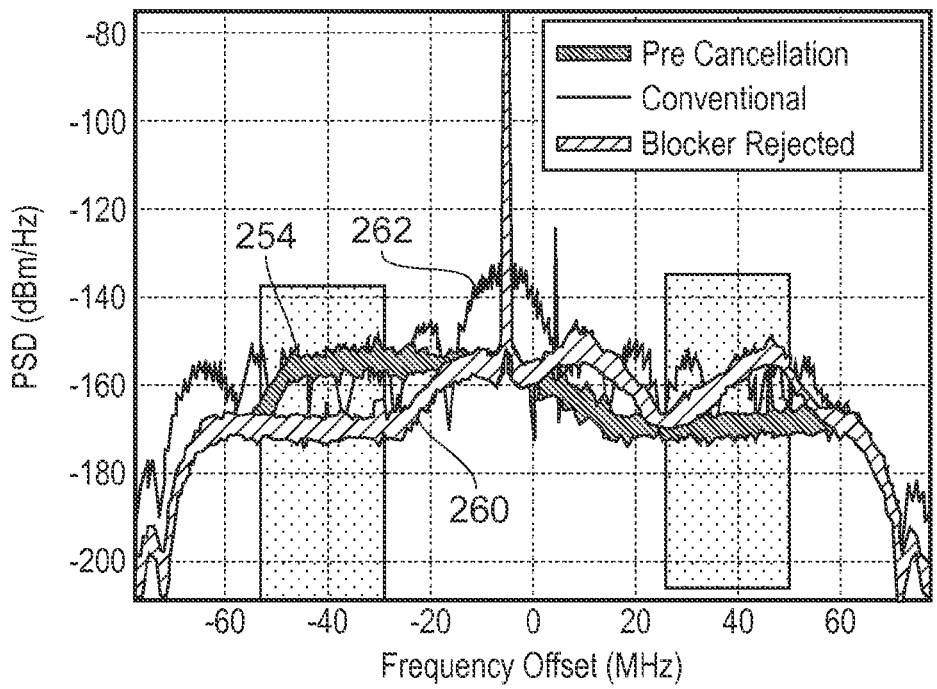
FIGS. 13a and 13b show similar plots to FIG. 12 for multiple channel adaption.
Figure 13B:
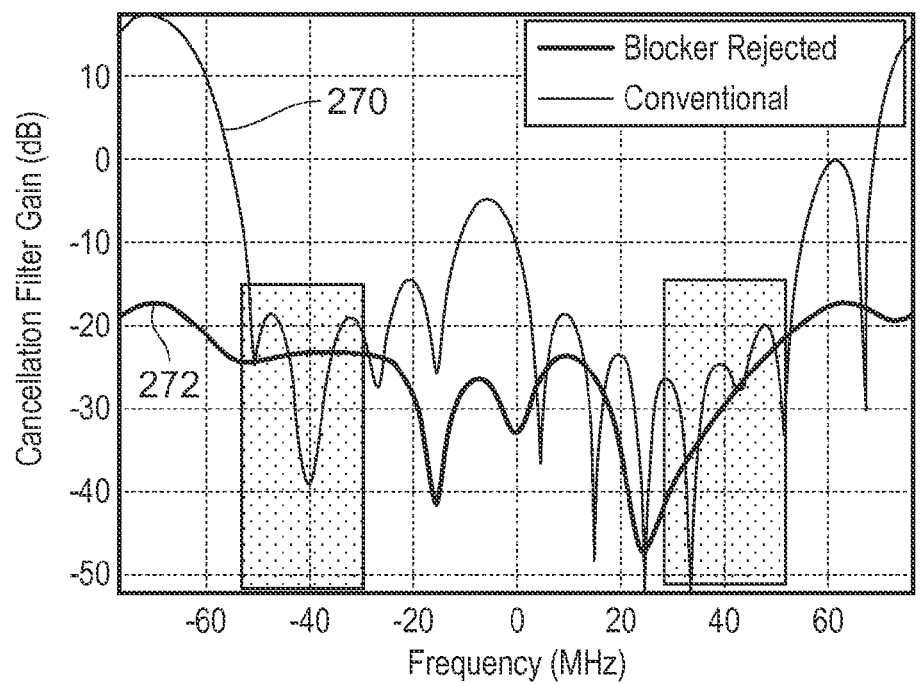

FIGS. 13a and 13b show similar data, where the active channels are simulated to be 20 MHz wide and offset at −40 MHz and +40 MHz from the central frequency in this frequency offset graph. In FIG. 13a the line 262 represents the power spectral density at the receiver after filter adaptation and the line 260 represents the power spectral density achieved by using the teachings of this disclosure. In FIG. 13b line 270 represents the FIR filter frequency gain with coefficients set using the prior art teachings whereas line 272 represents the response obtained using the teachings of this disclosure. The frequency response is smoother in the two active channels when the adaptation process described in this document is used.

The blocker algorithm described thus far works very well for off-channel blockers, i.e., the blockers that occur in inactive channels, and works well, but less well in the presence of on channel blockers. On-channels or active channels can hinder the transmit noise cancellation adaptation when the signal power is sufficiently large relative to the transmitter noise.

When seeking to adapt the noise cancellation filter, the leakage from the transmitter represents the "wanted" signal for the adaption algorithm. All other signals which are uncorrelated with the transmitter signal represent noise to the adaption algorithm. Thus, from this perspective, it can be seen that a strong signal at the receiver where that signal carries wanted data can actually represent a significant source of noise for the transmitter noise cancellation adaptation algorithm. Therefore, the presence of a strong wanted signal can degrade the performance of the noise cancellation algorithm. However, it can also be observed that in the presence of a strong signal, the leakage from the transmitter to the associated receiver becomes less significant and it may be preferable to work with previous estimates of the filter coefficients where those previous estimates were reliable, rather than taking the risk of adapting the coefficients where such adaptation might make the noise cancellation filter less accurate.

A decision on whether to update the adaptation algorithm can be made by comparing the power in the main receiver channel with the power in the observation channel. The power in the main receiver channel increases with the strength of the receive wanted signal, this signal serving as a blocker for the purposes of the adaptation algorithm. Meanwhile, the power in the observation channel is independent of the main channel signal power and depends only on the observed transmitter noise. Therefore, comparing the relative power levels can be used as an indicator as to whether the adaption algorithm should be run or should be temporarily suspended.

Figure 14:
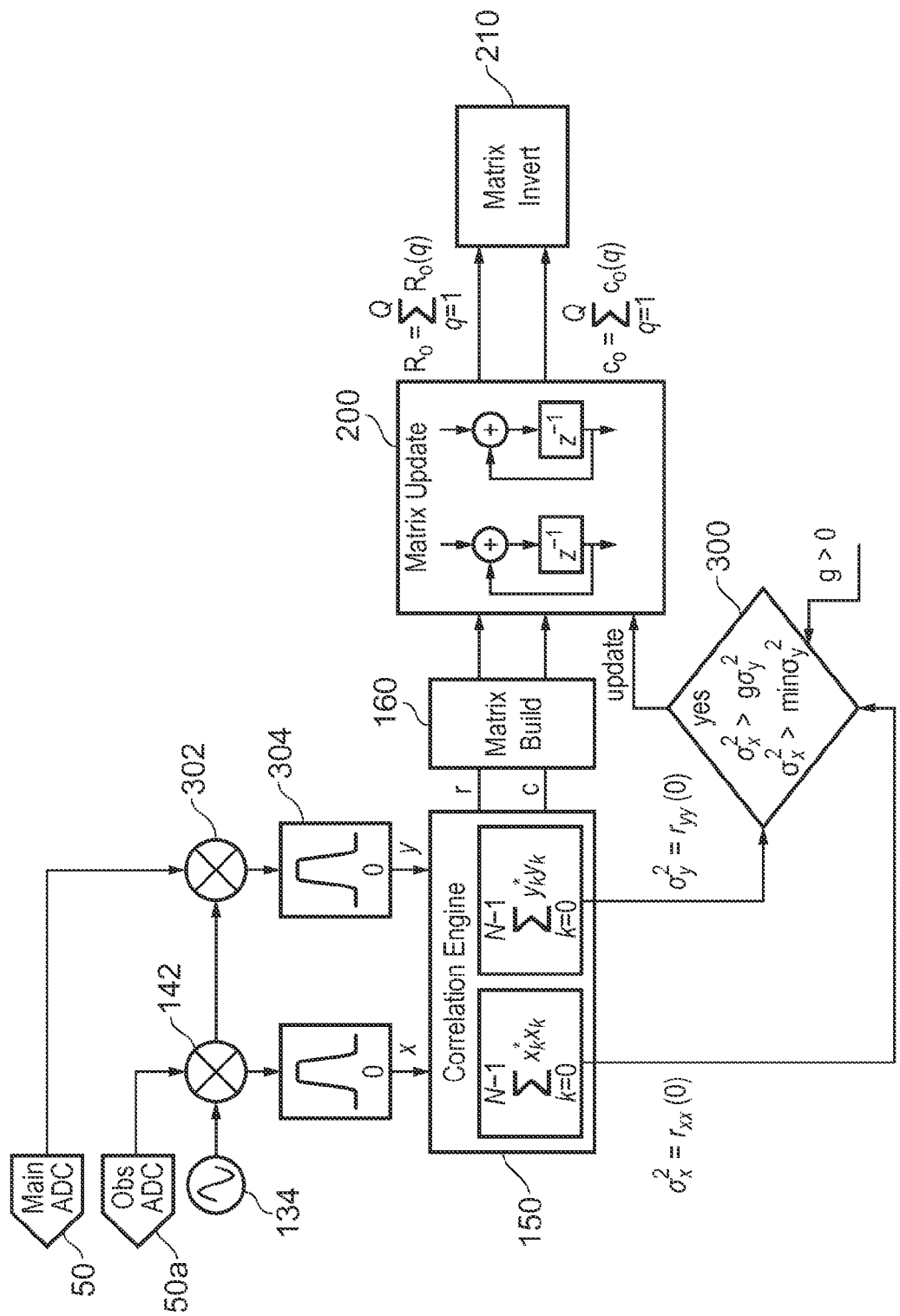
FIG. 14 shows a modification where a decision can be made, for each channel, when to allow it to provide data to the adaption engine.

FIG. 14 illustrates a modification to the previously described algorithm where the relative signal powers are compared and used to determine whether the matrices should be updated or not. The correlation engine 150 produces outputs of the signal power as a function of its normal operation. In particular, the signal power $\sigma_x^2 = r_0$ and the power in the main channel $\sigma_y^2$ can be calculated by adding one additional correlator in the correlation engine. These values can then be compared at a decision block 300 to determine if $\sigma_x^2$ is greater than a minimum value and whether $\sigma_x^2$ is greater than G $\sigma_y^2$ where G is a factor greater than zero and set by the system designer. If both of these conditions are achieved, then the decision block 300 allows the matrix update process to operate as described with respect to FIGS. 8 and 9. However, if one or both of these conditions are not satisfied, then the matrix update process can be inhibited for the qth channel in an update process. As illustrated in FIG. 14, this approach involves a further mixer 302 that is directly responsive to the output of the main ADC 50 and a further channel filter 304 analogous to the mixer 142 and channel filter 146 described with respect to FIG. 6. In tests, the adaptation process was inhibited when $\sigma_x^2$ was less than 0.1 of $\sigma_y^2$. However, the system designer is free to set their own thresholds by manipulating the value "G" provided to the decision block 300. The decision block 300 can be implemented by dedicated hardware or by a processor executing specific instructions stored in non-transitory computer readable storage.

Experiments have shown that the adaption engine and algorithm disclosed herein provides a full band solution which can be implemented before the digital down converter block within a receiver and which is capable of adapting within the presence of both large on channel and off channel blockers. Furthermore, by partitioning its functions between hardware and software its power budget can be constrained whilst it provides relatively good performance. By modifying the matrix and vector update process such that it only runs in respect of those channels where the channel gain between the observed channel and the main channel is above a prescribed level, and where the noise from the observed channel is above the described lower limit, the algorithm can deliver further improved performance. In particular, this approach can ensure that the information for that channel is only used for adaption if the signal power for that channel is sufficiently low whilst the channel noise is sufficiently high for the adaption to be uncompromised. Thus the decision to adapt on any given channel can be made dynamically depending on the respective noise and signal levels.

Figure 15:
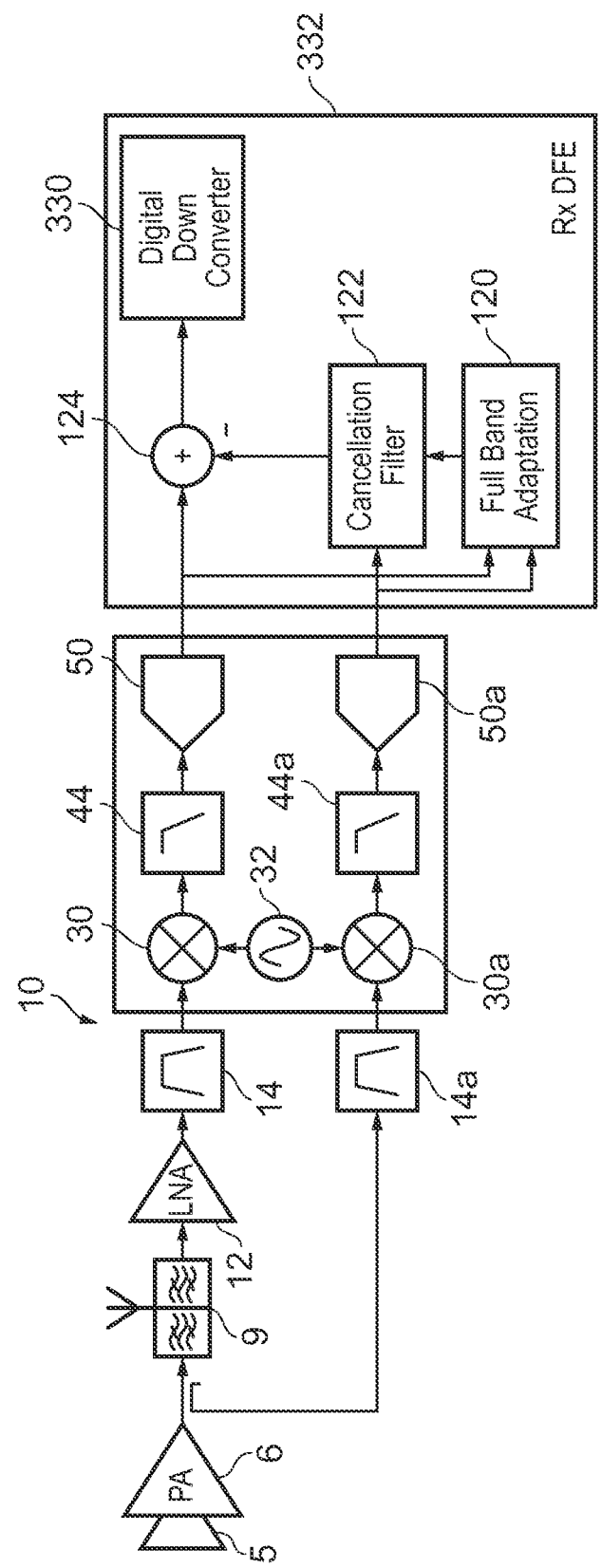
FIG. 15 shows an implementation of the transmitter noise cancellation engine independent of the DDC (digital down converter)
Figure 16:
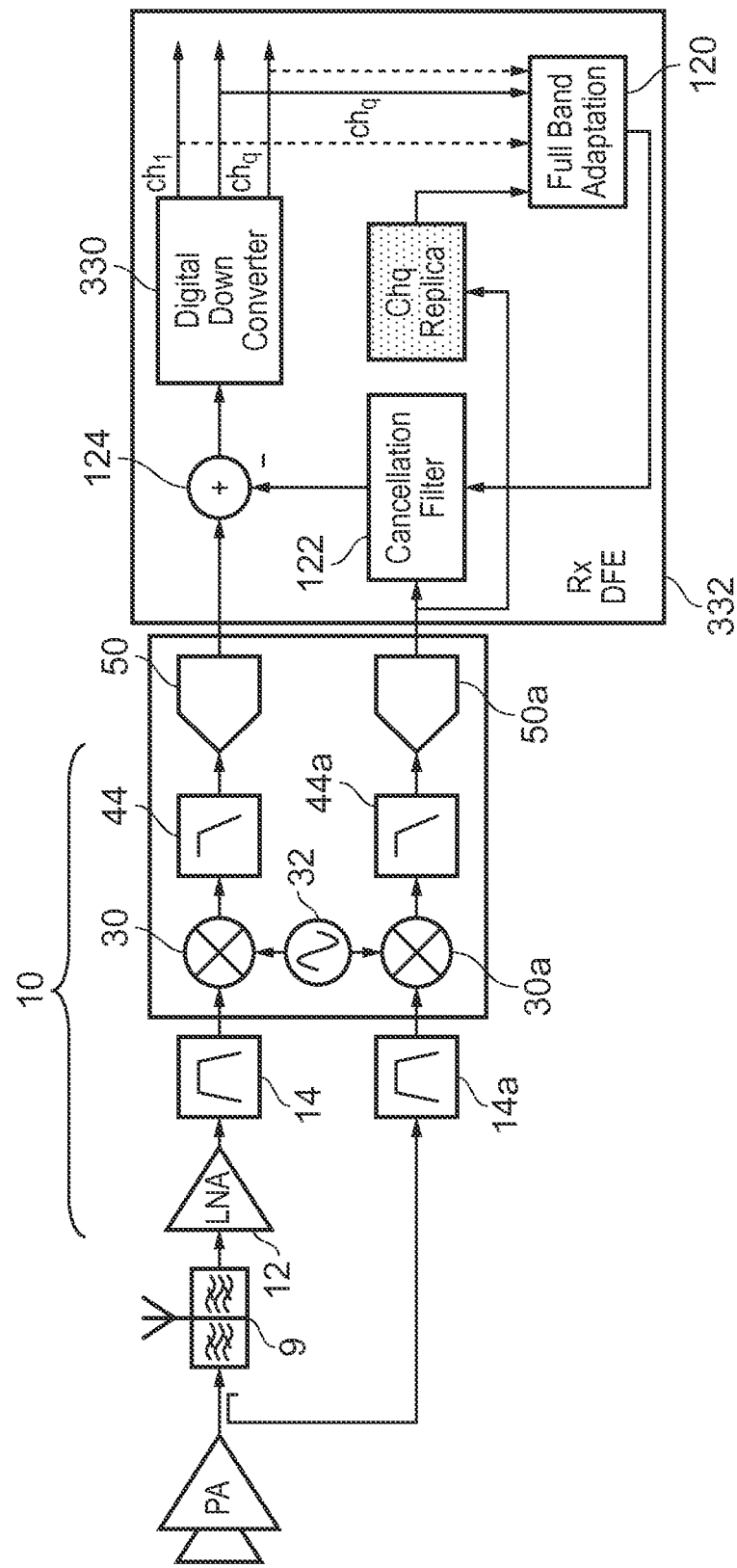
FIG. 16 shows a further implementation in association with the receiver DDC.

The adaption engine 120, FIR cancellation filter 122 and subtractor 124 presented herewith can be embedded into a digital front end of the receiver. A digital down converter (DDC) 330 can also be embedded into the digital front end 332 of the receiver 10. The adaptation engine 120 can receive a signal in a signal path to the DDC 330, for example, as shown in FIG. 15. Alternatively, the adaption engine may receive data from the DDC 300, for example, as shown in FIG. 16 where the individual channel data is provided by the DDC 330. Furthermore, the algorithm may be presented in independent hardware provided separately from the receiver digital front end or embedded into the receiver architecture itself such that it becomes transparent to the digital front end and system designer.

So far the disclosure has set out the use of a single filter which is used to filter the transmitter signal as observed in the observation channel and to apply that to the digitized output from the receiver 10 such that noise cancellation is performed across the entire receiver bandwidth, and hence across a plurality of channels simultaneously. With a single filter, the filter's characteristic should be adapted across all of the active channels. However, as an alternative a plurality of filters can be provided, but less than a filter per channel, such that the pass band covered by each filter is smaller, and hence the task of matching its response to the optimal response is simplified.

Figure 17:
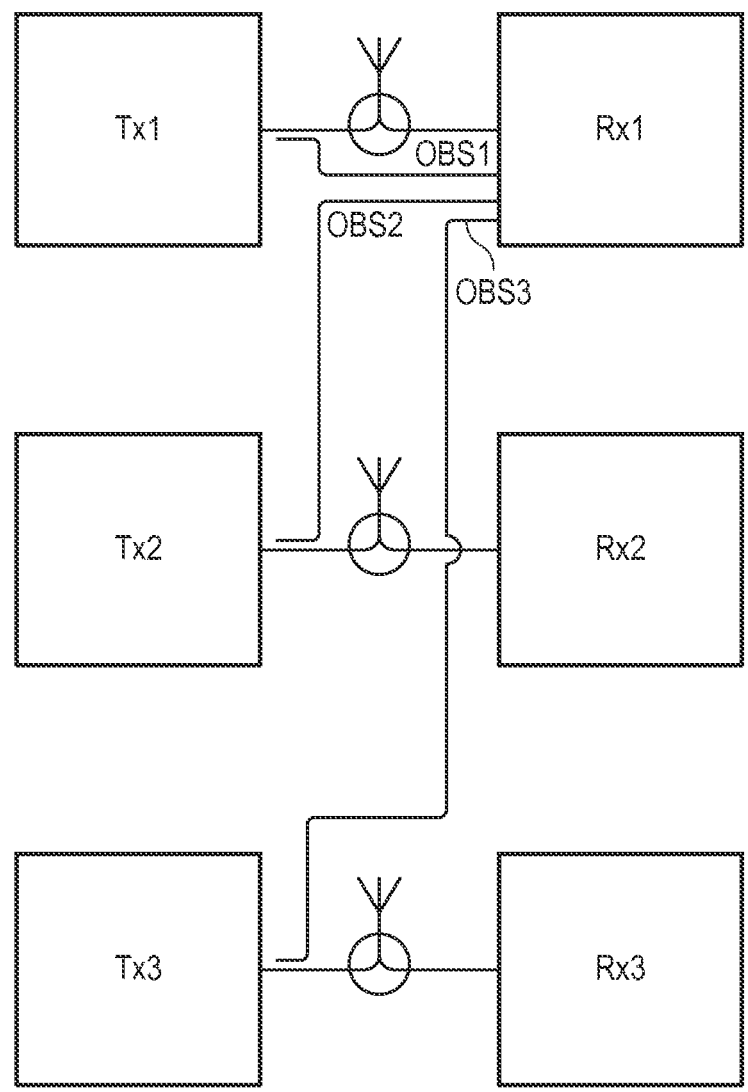
FIG. 17 shows an embodiment for use in multiple transmitter systems.

The teachings so far have been applied to a single transmitter and single receiver within a transceiver. However, a transceiver unit may comprise a plurality of transmitter and receiver pairs. Such an example is shown in FIG. 17 where three transmitters TX1, TX2 and TX3 are provided in association with receivers RX1, RX2 and RX3, respectively, all in relatively close spatial proximity to one another. Thus, although the transmitter and receiver pairs each have a pair of respective antennas, leakage from the antenna associated with TX2, and the antenna associate with TX3, can occur by virtue of these signals being received at the antenna associated with RX1. In order to address this, further observation paths can be provided from the second and third transmitters TX2 and TX3, respectively, such that the first receiver RX1 is responsive to a first observation path OBS1 relating to the transmitter TX1, as second observation path OBS2 relating to transmitter TX2, and a third observation path OBS3 relating to the third transmitter TX3. Cancellation filters analogous to the FIR cancellation filter 122 can be provided in respect of each of the observation paths and each associated with a respective adaptation engine 120, or a shared adaptation engine.

Thus, a method and apparatus are provided for reducing the effect of transmitter leakage within a receiver where cancellation can be performed as part of the receiver, as an intermediate block following the receiver's analog-to-digital converter but before the receiver's digital front end, or as a circuit responsive to the channelized output of the digital front end. The method and apparatus disclosed herein are suitable for use in a wide variety of telecommunications and other radio based systems where leakage from a transmitter to an associated receiver is undesirable.

Aspects of this disclosure can be implemented in various electronic devices. Examples of the electronic devices can include, but are not limited to, consumer electronic products, parts of the consumer electronic products, electronic test equipment, cellular communications infrastructure such as a base station, etc. Examples of the electronic devices can include, but are not limited to, a mobile phone such as a smart phone, a television, a computer monitor, a computer, a modem, a hand-held computer, a laptop computer, a tablet computer, an electronic book reader, a wearable computer such as a smart watch, a personal digital assistant (PDA), a microwave, a refrigerator, a stereo system, a DVD player, a CD player, a digital music player such as an MP3 player, a radio, a camcorder, a camera, a digital camera, a portable memory chip, a health care monitoring device, a vehicular electronics system such as an automotive electronics system or an avionics electronic system, a washer, a dryer, a washer/dryer, a peripheral device, a wrist watch, a clock, etc. Further, the electronic devices can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "electrically coupled", as generally used herein, refer to two or more elements that may be either directly electrically connected, or electrically connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description of Certain Embodiments using the singular or plural number may also include the plural or singular number, respectively. The word "or" in reference to a list of two or more items, where context permits, covers all of the following interpretations of the word: any of the items in the list, all of the items in the list, and any combination of the items in the list.

Moreover, conditional language used herein, such as, among others, "can," "could," "might," "may," "e.g.," "for example," "such as," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The accompanying claims and their equivalents are intended to cover such forms or modifications as would fall within the scope and spirit of the disclosure.

The claims presented here have been written in single dependency format for use with the USPTO. However, it should be understood that each claim can depend on any preceding claim except where that is clearly infeasible.

What is claimed is:

1. A method of reducing transmitter noise leaking into a receiver, the method comprising:
   processing an up-converted signal from a transmitter in an observation channel to provide an observed transmitter signal, the observation channel comprising an observation filter and a down-converter;
   estimating filter coefficients for a filter configured to inject a filtered version of a signal from the transmitter into the receiver to cause an impact of transmitter noise at the receiver across a plurality of channels to be reduced, said estimating being based on the observed transmitter signal; and
   updating the filter coefficients by weighting estimates of transmitter noise for active channels in each of a plurality of update sequences.

2. A method as claimed in claim 1, in which during an update sequence of the plurality of update sequences, estimates for transmitter noise leakage are generated for each active channel within a receiver band, and these estimates are carried forward into a filter update operation.

3. A method as claimed in claim 1, in which during an update sequence of the plurality of update sequences, estimates for transmitter noise leakage are either:
   a) not generated for inactive channels, or
   b) are generated for inactive channels and weighted so as to reduce their contribution to an update process.

4. A method as claimed in claim 1, in which said updating is periodically repeated.

5. A method as claimed in claim 1, in which active channels are identified for said updating.

6. A method as claimed in claim 1, wherein, an estimate of at least one of transmitter power or received signal strength is examined to estimate an effect of noise leakage within the receiver.

7. A method as claimed in claim 6, in which the weighting estimates of transmitter noise for a particular channel is modified based on an estimate of an effect of the transmitter noise.

8. A method as claimed in claim 1, in which the filter is a single filter operable across a full receiver bandwidth in the digital domain of the receiver.

9. A method as claimed in claim 1, in which the filter comprises a plurality of filters provided to operate over a plurality of channels, where a number of channels is greater than a number of filters of the plurality of filters, such that an individual filter of the plurality of filters is configured to provide noise reduction for at least two channels.

10. An apparatus for reducing an effect of transmitter noise leaking into a receiver, the apparatus comprising:
    an observation channel configured to process an up-converted signal from a transmitter and to provide an observed transmitter signal;
    a transmitter noise cancellation filter configured to apply a cancellation signal in a digital domain of the receiver, the transmitter noise cancellation filter configured to apply the cancellation signal across a plurality of receiver channels; and
    an adaptation engine configured to repeatedly update the transmitter noise cancellation filter, the adaptation engine configured to estimate transmitter noise in the up-converted signal from the transmitter on a channel by channel basis based on the observed transmitter signal and weight estimates of the transmitter noise.

11. An apparatus as claimed in claim 10, in which the adaptation engine is configured such that channels of the receiver channels that are inactive are given reduced weight or inhibited from contributing data to an update process for updating the transmitter noise cancellation filter.

12. An apparatus as claimed in claims 10, in which the adaptation engine is configured such that channels of the receiver channels where a received signal strength is large or transmitter noise leaking from a transmitter is small are given less weight in an update process or inhibited from contributing to the update process.

13. An apparatus as claimed in claim 10, where a digital output of the observation channel is filtered by the transmitter noise cancellation filter, wherein the transmitter noise cancellation filter comprises a single filter operable to simultaneously provide a noise reduction signal to a plurality of channels.

14. An apparatus as claimed in claim 10, the adaptation engine comprises a channel filter.

15. An apparatus as claimed in claim 10, in which the apparatus is responsive to a signal from a second transmitter to reduce noise from the second transmitter on the plurality of receiver channels.

16. An apparatus as claimed in claim 10, in which the transmitter noise cancellation filter is configured to apply the cancellation signal to an output of an analog-to-digital converter of the receiver.

17. An apparatus as claimed in claim 10, wherein the transmitter noise cancellation filter comprises a plurality of taps, and wherein the adaptation engine is configured to update the plurality of taps based on the weighted estimates of transmitter noise.

18. An electronic system comprising:
    a transmitter comprising an up-converter;
    an observation channel configured to process an up-converted signal from the transmitter and to provide an observed transmitter signal; and
    a receiver comprising:

a transmitter noise cancellation filter configured to apply a cancellation signal to a digital signal of the receiver across a plurality of receiver channels; and an adaptation engine configured to:
- generate channel by channel estimates of transmitter noise in a signal of the transmitter at a node between the up-converter and an antenna based on the observed transmitter signal; and
- provide updated filter coefficients to the transmitter noise cancellation filter based on weighting the channel by channel estimates of transmitter noise.

19. An electronic system as claimed in claim 18, wherein an indication of the up-converted signal is converted into a digital baseband signal for the transmitter noise cancellation filter by the observation channel.

20. An electronic system as claimed in claim 18, wherein the up-converted signal is an output of a power amplifier of the transmitter.

\* \* \* \* \*

UNITED STATES PATENT AND TRADEMARK OFFICE
CERTIFICATE OF CORRECTION

Page 1 of 1

PATENT NO. : 9,912,358 B2
APPLICATION NO. : 14/874883
DATED : March 6, 2018
INVENTOR(S) : Patrick Joseph Pratt and Peadar Antony Forbes It is certified that error appears in the above-identified patent and that said Letters Patent is hereby corrected as shown below:

In the Specification

In Column 9 at Line 17, after "filter" insert --.--.

In Column 9 at Line 39, after "$c=[c_0, c_1, c_2, \ldots c_m]$" insert --.--.

In the Claims

In Column 16 at Line 35, in Claim 12, change "claims 10," to --claim 10,--.

Signed and Sealed this
Twelfth Day of June, 2018

Andrei Iancu
*Director of the United States Patent and Trademark Office*